US012732868B2

(12) United States Patent
Dreiling

(10) Patent No.: US 12,732,868 B2
(45) Date of Patent: Sep. 8, 2026

(54) SYSTEM AND METHOD FOR DYNAMICALLY ADJUSTING BANDWIDTH PARTS

(71) Applicant: T-Mobile Innovations LLC, Overland Park, KS (US)

(72) Inventor: Ryan Patrick Dreiling, Shawnee, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 492 days.

(21) Appl. No.: 18/173,244

(22) Filed: Feb. 23, 2023

(65) Prior Publication Data

US 2024/0292277 A1 Aug. 29, 2024

(51) Int. Cl.
*H04W 28/20* (2009.01)
*H04W 24/08* (2009.01)

(52) U.S. Cl.
CPC .......... *H04W 28/20* (2013.01); *H04W 24/08* (2013.01)

(58) Field of Classification Search
CPC .................................................... H04W 28/20
See application file for complete search history.

(56) References Cited

U.S. PATENT DOCUMENTS

2021/0329666 A1* 10/2021 Ljung ............... H04W 72/0453
2023/0308948 A1* 9/2023 Jia ......................... H04W 36/06

FOREIGN PATENT DOCUMENTS

CN 117835349 A * 4/2024 ........ H04W 72/0453
KR 20240038356 * 3/2024 ........ H04W 72/0453
KR 20240038356 A * 3/2024 ........ H04W 72/0453

OTHER PUBLICATIONS

Lin et al., "A Primer on Bandwidth Parts in 5G New Radio," in 5G and Beyond, pp. 357-370. Springer, Cham, (2021).

* cited by examiner

*Primary Examiner* — Abdeltif Ajid
(74) *Attorney, Agent, or Firm* — Jones Burke PLLC

(57) ABSTRACT

Systems, methods, and processing nodes for managing network resources perform and/or comprise: setting a usage threshold for an access node, wherein the access node is configured to communicate with a plurality of wireless devices using a carrier including a first bandwidth part (BWP), wherein the first BWP has a first bandwidth; scheduling communications with the plurality of wireless devices over the first BWP; monitoring a usage parameter; and in response to a determination that the usage parameter exceeds the usage threshold, adjusting a BWP allocation for the carrier.

17 Claims, 5 Drawing Sheets

SYSTEM AND METHOD FOR DYNAMICALLY ADJUSTING BANDWIDTH PARTS

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR).

Various portions of the electromagnetic spectrum are allocated to wireless communications. For example, 5G NR communication utilizes frequencies below 6 GHz (Frequency Range 1) and above 24 GHz (Frequency Range 2), which are further divided into a plurality of bands which themselves may be further divided into component carriers (CCs). In NR communication, CCs may correspond to bandwidths of up to 100 megahertz (MHz) in Frequency Range 1 and up to 400 MHz in Frequency Range 2. NR CCs may also be aggregated together to provide increased bandwidth. Due to this wide bandwidth, NR introduces the concept of a bandwidth part (BWP), which is a group of contiguous of resource blocks (RBs). A BWP may have a bandwidth of less than or equal to a bandwidth of the CC in which it resides, and generally greater than or equal to the bandwidth required for one synchronization signal block (SSB). A given CC may include multiple BWPs. Different BWPs may be configured with different parameters and/or signal characteristics. A wireless device may be configured with up to four BWPs in the downlink (DL) and uplink (UL) directions, but only one BWP may be active at a given time.

OVERVIEW

Various aspects of the present disclosure relate to systems and methods of managing network resources (e.g., by dynamically allocating and de-allocating frequency resources to various RATs) in a telecommunications network.

In one exemplary aspect of the present disclosure, a method of managing network resources comprises setting a usage threshold for an access node, wherein the access node is configured to communicate with a plurality of wireless devices using a carrier including a first bandwidth part (BWP), wherein the first BWP has a first bandwidth; scheduling communications with the plurality of wireless devices over the first BWP; monitoring a usage parameter; and in response to a determination that the usage parameter exceeds the usage threshold, adjusting a BWP allocation for the carrier.

In another exemplary aspect of the present disclosure, a system for managing network resources comprises an access node configured to communicate with a plurality of wireless devices over a carrier including a first bandwidth part (BWP), the access node including at least one electronic processor configured to perform operations including: setting a first usage threshold for the access node; instructing the plurality of wireless devices to communicate with the access node over the first BWP; monitoring a usage parameter for the access node; and in response to a first determination that the usage parameter exceeds the first usage threshold for at least a first predetermined amount of time, adjusting a BWP allocation of the carrier.

In another exemplary aspect of the present disclosure, a non-transitory computer-readable medium stores instructions that, when executed by an electronic processor of a processing node, cause the processing node to perform operations comprising scheduling communications between an access node and a plurality of wireless devices using a first bandwidth part (BWP) of a carrier; monitoring a usage parameter for the access node; and in response to a determination that the usage parameter meets a utilization criteria, adjusting a BWP allocation for the carrier.

In this manner, these and other aspects of the present disclosure provide for improvements in at least the technical field of telecommunications, as well as the related technical fields of network management, device management, network security, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
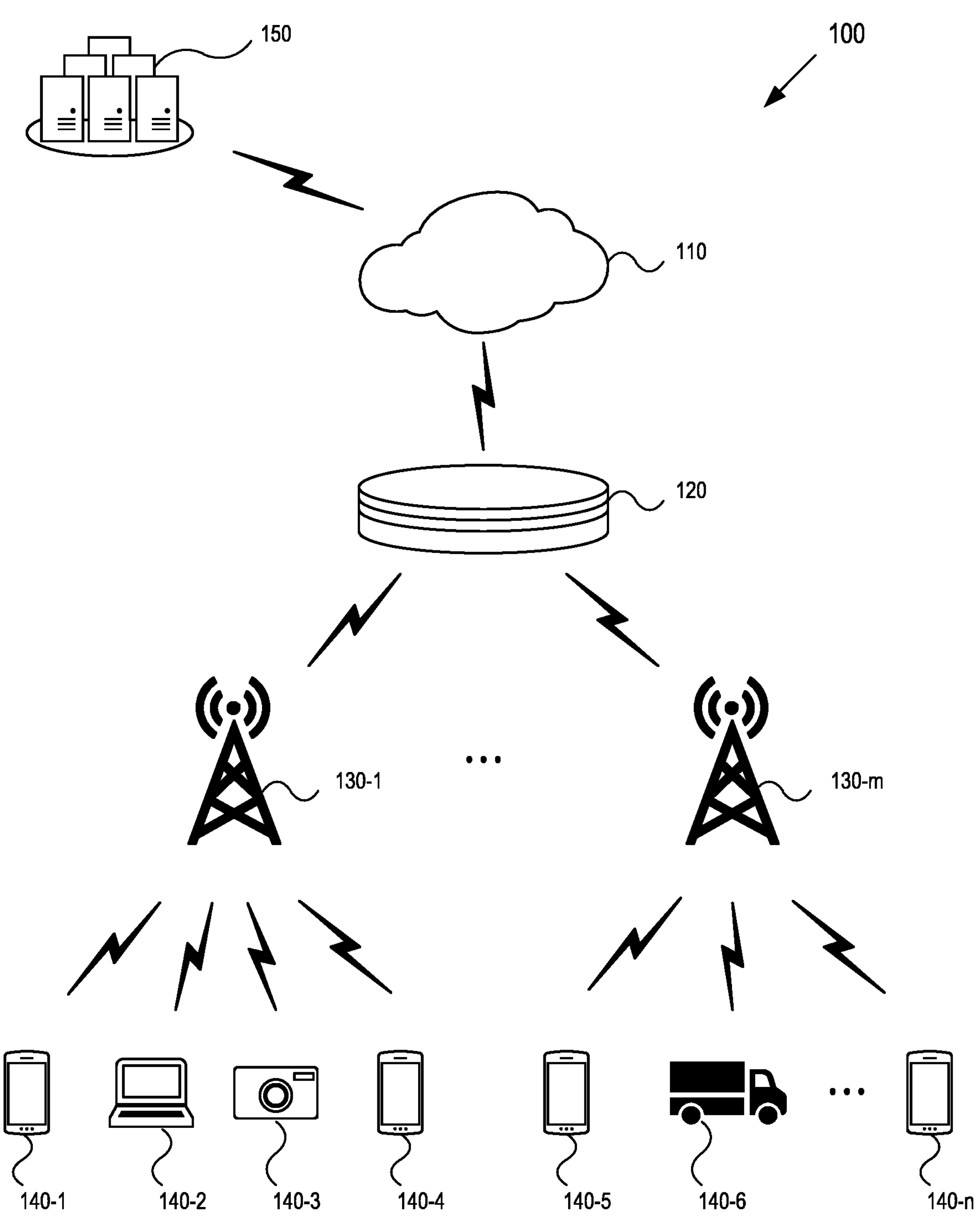
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include an electronic processor included in the access node and/or an electronic processor included in any controller node in the wireless network that is coupled to the access node.

The use of BWP within a CC may provide increased flexibility in how the overall carrier is used. For example, different BWPs may be provided with different "numerologies," which correspond to sets of parameters such as subcarrier spacing and symbol duration. Thus, by configuring a CC with multiple BWPs, a network provider may flexibly utilize radio resources to support a variety of different types of user equipment, to reduce power consumption within the connected UEs, to reserve bandwidth for certain uses, and so on. However, it may not be the case that the initial allocation of BWPs provides sufficient flexibility or performance at some later time. For example, assigning a certain category of users (e.g., voice-over-NR or VoNR users) to a certain BWP may be effective initially, but as more wireless devices within the category join the network capacity and call quality may be adversely affected. It may be possible to switch some portion of the wireless devices to another pre-existing BWP in response; however, if the size of the other BWP is not set appropriately for current usage conditions (e.g., if the initial BWP allocation is based on outdated information or conditions), the wireless devices may be switched to a BWP that is excessively large. This may reduce the power consumption benefits realized through the use of BWP. Moreover, too-frequent switching of BWPs may result in excessive signaling overhead, dropped packets requiring retransmission, and so on.

Accordingly, the present disclosure provides for systems, methods, and devices which implement the dynamic adjustment of BWP allocation within a carrier, including the dynamic provision or configuration of new BWPs and/or dynamic modification of existing BWPs. Various aspects of the present disclosure provide for such adjustments in situations where, for example and without limitation, resources are being overutilized, call quality suffers, overly frequent UE switching occurs, and the like. Thus, various aspects of the present disclosure improve NR UE and/or access node performance, provide improved utilization of resources (e.g., better spectral efficiency, and/or improved battery usage.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on. The term "wireless device" is used interchangeably with the term "wireless communication device" herein.

In the networks and systems described herein, data to and from wireless devices may be transmitted using a series of data frames, each of which has a duration of 10 milliseconds (ms). A frame constitutes ten subframes, each having a duration of 1 ms. In NR communication, each subframe is further divided into one or more slots, wherein the number of slots depends on the numerology of the corresponding BWP for the communication, and each slot is further divided into fourteen (or in some cases twelve) data symbols. The term numerology, discussed above, refers to a set of carrier waveform parameters, including subcarrier spacing ($\Delta f$ or SCS), cyclic prefix (CP) duration, and slot duration/number.

In accordance with various aspects of the present disclosure, a cellular or wireless network may be provided by an access node. While examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB. Additionally, for purposes of illustration and explanation, various portions of this detailed description refer to implementations in a network a 5G NR RAT; however, the present disclosure is not so limited. The systems and methods described herein may be implemented in a network using any RAT capable of supporting BWPs, including further extensions or updated implementations of 5G (e.g., 5G Advanced) or newer generations of RATs.

FIG. 1 illustrates an exemplary system 100 for use with various aspects of the present disclosure. As illustrated, the system 100 includes a cloud platform 110, a core network 120, and a plurality of access nodes 130-1 to **130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120** via a wired connection.

The cloud platform 110, which may be an NR cloud platform, may perform processing and forward results to the computing systems and devices 150 and/or the wireless devices 140. The core network 120, which may be a 5G Core Network (5GCN), connects with the cloud platform 110 and the access nodes 130. Examples of the core network and/or the access nodes 130 will be described in more detail below with respect to FIGS. 2 and 3. Subsets of the access nodes 130 may be respectively configured to provide service in different areas, on different bands, for different RATs, and so on. FIG. 1 illustrates a situation in which the system 100 is operated by a single network operator. In many geographical areas, multiple access nodes 130 provide coverage that may overlap.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IoT) devices such as smart-home sensors, and the like. Examples of the wireless devices 140 will be described in more detail below with respect to FIGS. 2 and 4.

Figure 2:
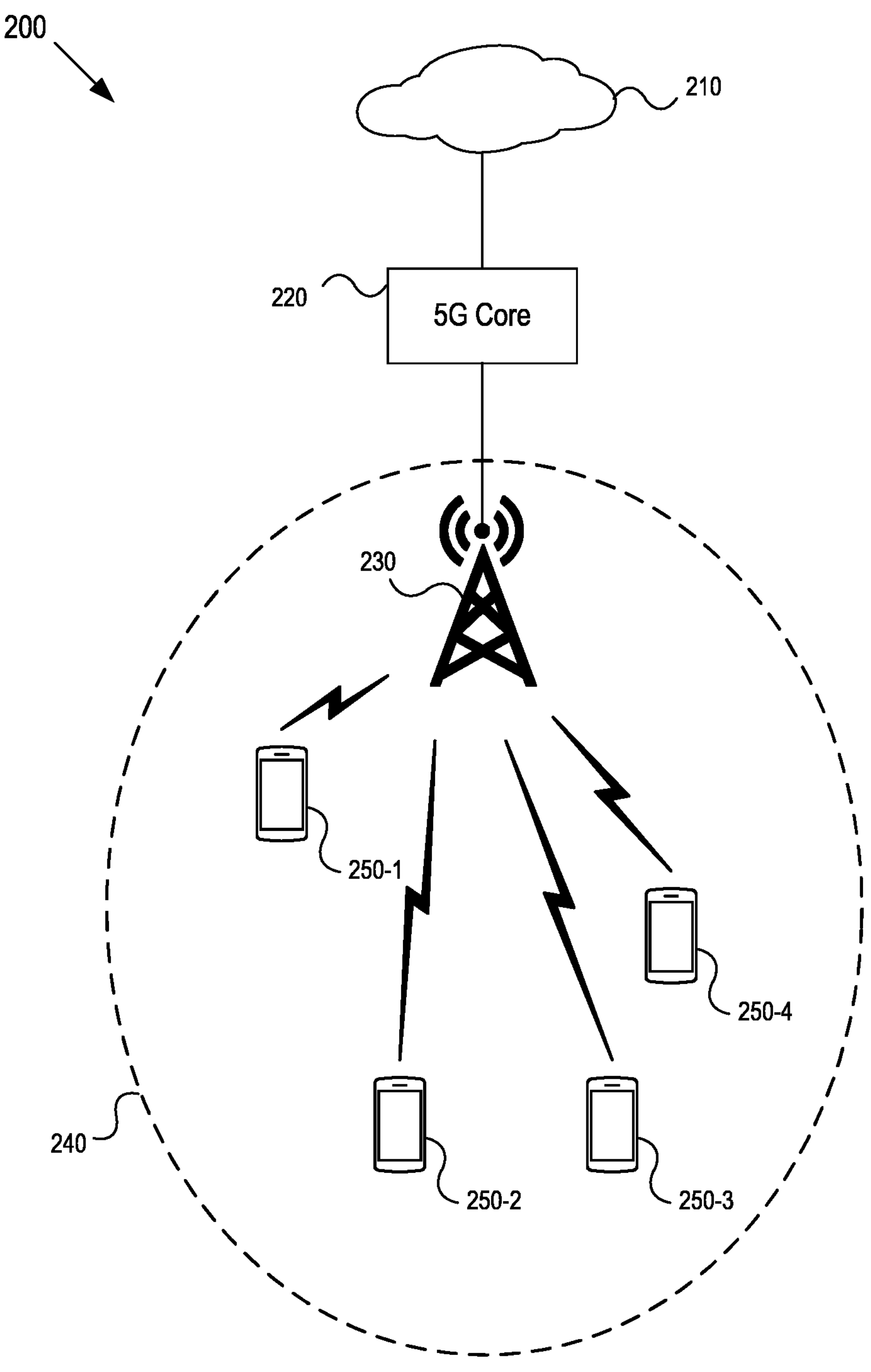
FIG. 2 illustrates an exemplary configuration of a system for wireless communication in accordance with various aspects of the present disclosure

FIG. 2 illustrates a configuration in which a system 200 provides coverage via an access node within a particular area. For purposes of illustration and explanation, the system 200 is illustrated as a 5G System (5GS); however, in practical implementations the system 200 may correspond to any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

As illustrated, the system 200 comprises a communication network 210, a 5G core 220, an access node 230 which provides service in a coverage area 240, and a plurality wireless devices 250-1 to 250-4 (collectively referred to as wireless devices 250). For purposes of illustration and ease of explanation, only one access node 230 and four wireless devices 250 are shown in the system 200; however, as noted above with regard to FIG. 1, additional access nodes and/or additional or fewer wireless devices may be present in the system 200. In the illustration of FIG. 2, the access node 230 is connected to the communication network 210 via an NR path (including the 5G core 220); however, in practical implementations the access node 230 may be connected to the communication network 210 via multiple paths (e.g., using multiple RATs). The access node 230 communicates with the 5G core 220 via one or more communication links, each of which may be a direct link (e.g., an N2 link, an N3 link, or the like). The access node 230 may also communicate with additional access nodes via a direct link.

A scheduling entity may be located within the access node 230 and/or the 5G core 220, and may be configured to accept and deny connection requests and manage communication sessions, to allocate resources and RATs to improve overall network resource utilization and performance, to configure connected wireless devices, and the like. The access node 230 may be any network node configured to provide communications between the connected wireless devices and the communication network 210, including standard access nodes and/or short range, lower power, small access nodes. As examples of a standard access node, the access node 230 may be a macrocell access node, a base transceiver station, a radio base station, a gNodeB in 5G networks, an eNodeB in 4G/LTE networks, or the like, including combinations thereof. In one particular example, the access node 230 may be a macrocell access node in which a range of the coverage area 240 is from approximately five to thirty-five kilometers (km) and in which the output power is in the tens of watts (W). As examples of a small access node, the access node 230 may be a microcell access node, a picocell access node, a femtocell access node, or the like, including a home gNodeB or a home eNodeB.

The access node 230 can comprise one or more electronic processors and associated circuitry to execute or direct the execution of computer-readable instructions such as those described herein. In so doing, the access node 230 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 230 can receive instructions and other input at a user interface.

Figure 3:
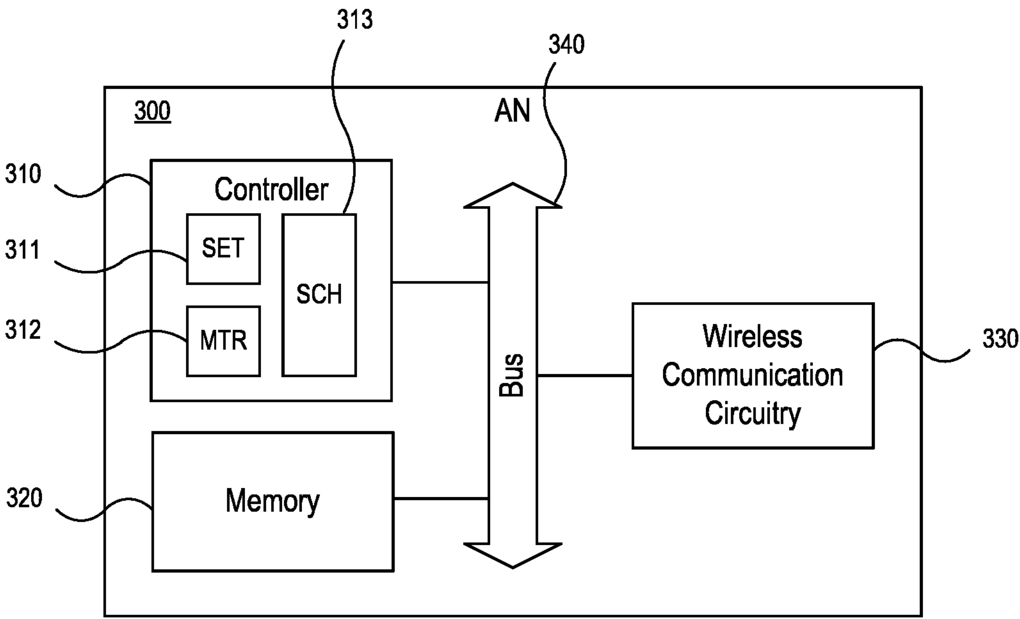
FIG. 3 illustrates an exemplary access node in accordance with various aspects of the present disclosure.

FIG. 3 illustrates one example of an access node 300, which may correspond to one or more of the access nodes 130 shown in FIG. 1 and/or the access node 230 shown in FIG. 2. The access node 300 may be configured to communicate with a plurality of wireless devices using a wideband (e.g., a carrier or combination of carriers) including at least one narrowband (e.g., including a first BWP and, in some implementations, a second BWP). As illustrated the access node 300 includes a controller 310, a memory 320, wireless communication circuitry 330, and a bus 340 through which the various elements of the access node 300 communicate with one another. The controller 310 is one example of an electronic processor, and may include sub-modules or units, each of which may be implemented via dedicated hardware (e.g., circuitry), software modules which are loaded from the memory 320 and processed by the controller 310, firmware, and the like, or combinations thereof. These include a setting module 311, a monitoring module 312, and a scheduling module 313. Some or all of the sub-modules or units may physically reside within the controller 310, or may instead reside within the memory 320 and/or may be provided as separate units within the access node 300, in any combination. The various sub-modules or units may include or implement logic circuits, thereby to perform operations such as setting parameters, monitoring parameters, comparing parameters, generating instructions, and so on.

While FIG. 3 illustrates the setting module 311, the monitoring module 312, and the scheduling module 313 as being separate modules, in practical implementations some of the modules may be combined with one another and/or may share components. Through the setting module 311, the monitoring module 312, and the scheduling module 313, the access node 300 (e.g., the controller 310) may be configured to perform various operations to implement methods in accordance with the present disclosure. While one example of operations performed by the modules is described here, in practical implementations at least some of the operations described as being performed by one module may instead be performed by another module, including a module not explicitly named here.

The setting module 311 may be configured to set various trigger criteria and/or thresholds. For example, the setting module 311 may be configured to set or define a first usage threshold for the access node 300. The setting module 311 may additionally be configured to set or define a second usage threshold for the access node 300, which may be the same as or different than the first usage threshold. In some implementations the second usage threshold is lower than the first usage threshold. The thresholds may also relate to parameters other than usage; for example, the setting module 311 may be configured to set or define one or more device thresholds, capacity thresholds, quality thresholds, tonnage thresholds, resource thresholds, and/or switching thresholds. Where the setting module 311 is configured to set one or more trigger criteria, the trigger criteria may relate to comparing a value of a parameter to a threshold. The various trigger criteria or thresholds may additionally include time parameters; for example, a predetermined amount of time for which a respective trigger criteria must exist or be met in order for the trigger criteria to be deemed satisfied, or a predetermined amount of time for which a respective parameter must be greater than or less than a corresponding threshold must be surpassed in order for it to be determined that the threshold has been surpassed (in the corresponding direction). The duration of the amount of time may be defined by an operator of the access node 300, such as a network operator. Any of the thresholds or criteria may be based on a time-of-day, a geography, a network architecture, a current BWP allocation, or combinations thereof.

The monitoring module 312 may be configured to monitor a usage parameter or, in some implementations, multiple usage parameters. A usage parameter may be related to a remaining capacity for communication between the access node 300 and connected wireless devices using a particular BWP (e.g., a first BWP of a carrier), to a number of users communicating via the particular BWP or number of wireless devices connected to the access node 300 via the particular BWP, a connection quality in the particular BWP, or combinations thereof. For example, the usage parameter may be a total number of the plurality of wireless devices connected to the access node 300, a remaining capacity of the access node 300 in a particular BWP (e.g., the first BWP of the carrier), a connection quality for connections between the access node 300 and connected wireless devices over the particular BWP, an overall tonnage for the access node 300 in the particular BWP, a resource block utilization of the access node 300 in the particular BWP, a frequency at which respective ones of the plurality of wireless devices switch from the particular BWP to another BWP, or combinations thereof.

The monitoring module 312 may also be configured with various logic circuits or elements in order to various logic operations, including but not limited to operations of comparing, monitoring, and identifying various aspects of the network and/or the access node 300. For example, the logic circuits or elements may be configured to compare the usage parameter or parameters to one or more of the thresholds and/or criteria described above and make determinations based on the comparison.

The scheduling module 313 may be configured to determine the manner in which the wireless devices connected to the access node 300 perform communications with the access node 300. For example, the scheduling module 313 may be configured to schedule communications with the plurality of wireless devices so that they are performed using a particular BWP (e.g., a first BWP). The scheduling module 313 may also be configured to determine and/or set various BWP allocations for the carrier to be implemented by the access node 300 and/or any connected wireless devices. For example, in response to a determination made by the monitoring module 312 (e.g., a determination that the usage parameter exceeds the first usage threshold at a given time or for a first predetermined amount of time, a determination that the usage parameter meets the utilization criteria at the given time or for the first predetermined amount of time, etc.), the scheduling module 313 may be configured to adjust a BWP allocation for the carrier.

In one implementation, adjusting the BWP allocation may include configuring an additional BWP within the carrier (e.g., a second BWP). The second BWP may be configured by generating a control message, such as a Radio Resource Control (RRC) message, which includes an identifier for a starting RB of the second BWP as well as a number of RBs included in the second BWP. The second BWP may have a larger bandwidth than the first BWP, but may have the same numerology as the first BWP to ensure device compatibility. In this implementation, the scheduling module 313 may subsequently be configured to instruct a subset of the plurality of wireless devices (e.g., one, some, or all of the plurality of wireless devices) to switch from communication with the access node 300 using the first BWP to communication with the access node 300 using the second BWP. This may be accomplished by sending the RRC message to the subset of the plurality of wireless devices followed by an instruction to select the second BWP as the active BWP. In the event that a particular wireless device has already been configured with the maximum of four BWP, the scheduling module 313 may instruct the particular wireless device to de-configure one or more of the existing BWP in order to accommodate the second BWP. The de-configured BWP may, in some implementations, be the first BWP.

In another implementation, adjusting the BWP allocation may include increasing a size of the first (existing) BWP from a first bandwidth to a second bandwidth larger than the first bandwidth. The first BWP may be reconfigured by generating a control message, such as an RRC message, which includes a new identifier for a new starting RB of the first BWP, a new number of RBs included in the first BWP, or both. Preferably, all RBs which were included in the initial range for the first BWP will be included in the new range for the first BWP, although the present disclosure is not so limited.

In either implementation, the scheduling module 313 may be configured to subsequently readjust the BWP allocation, for example to reverse the adjustment of the BWP allocation. For example, in response to a later determination made by the monitoring module 312 (e.g., a determination that the usage parameter no longer exceeds the first usage threshold or a second usage threshold at a given time or for a second predetermined amount of time, a determination that the usage parameter no longer meets the utilization criteria at the given time or for the second predetermined amount of time, etc.), the scheduling entity may be configured to revert to an initial BWP allocation of the carrier. This may be accomplished by generating a new control message, such as an RRC message, which includes the initial identifier for the starting RB of the first BWP and the initial number of RBs included in the BWP. The scheduling module 313 may first instruct all wireless devices communicating with the access node 300 via the second BWP (where applicable) to revert to communicating with the access node 300 via the first BWP, and then may transmit the RRC message to the wireless devices.

Figure 5A:
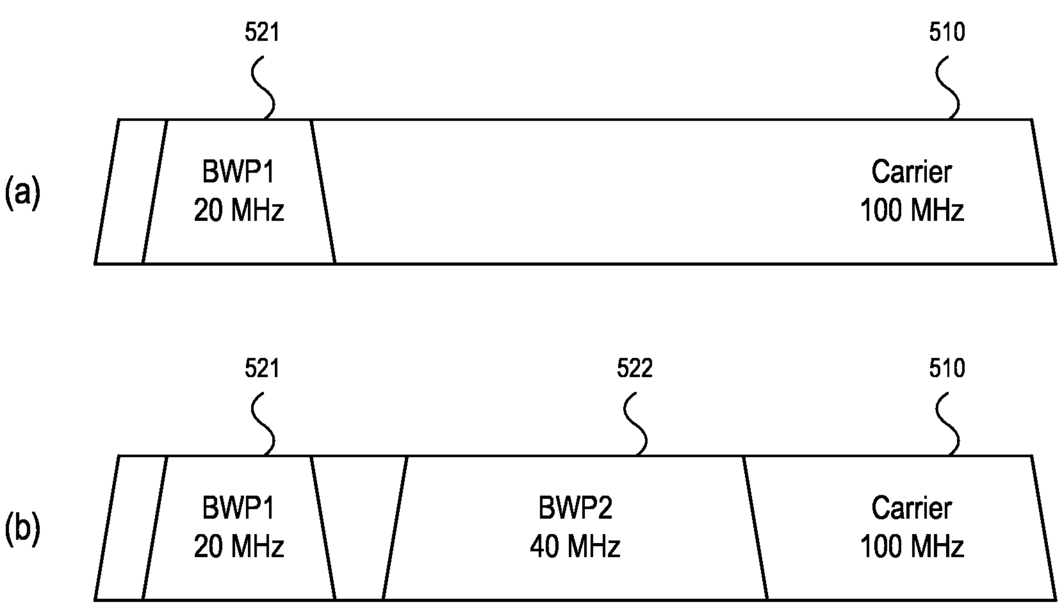
FIGS. 5A and 5B illustrate exemplary in-band resource allocations in accordance with various aspects of the present disclosure.
Figure 5B:
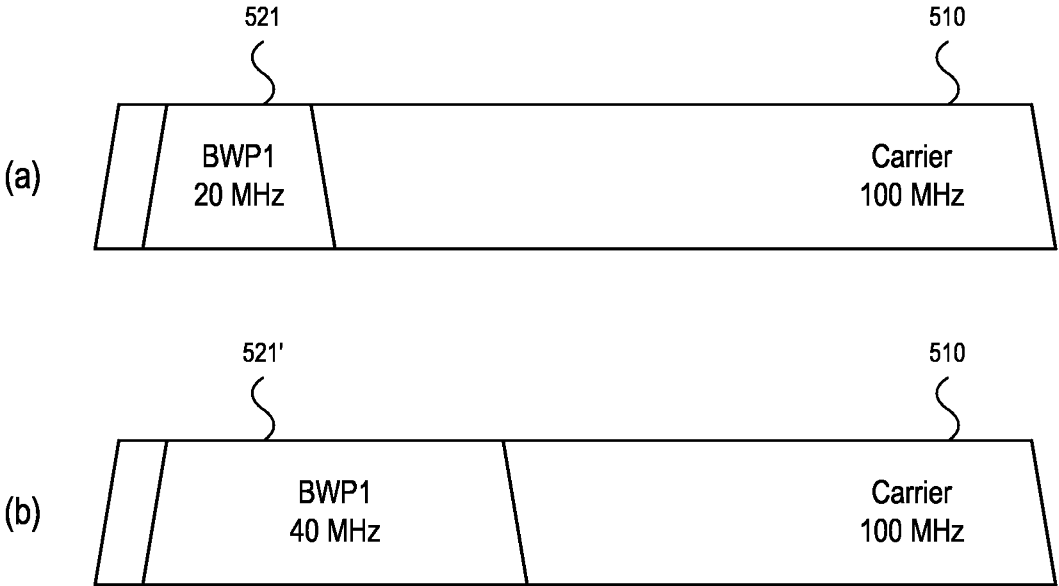

Examples of load balancing and dynamic BWP adjustment operations collectively performed by the setting module 311, the monitoring module 312, and the scheduling module 313 is illustrated in FIGS. 5A and 5B. In both of FIGS. 5A and 5B, configuration (a) illustrates a pre-adjustment BWP allocation for a carrier and configuration (b) illustrates a post-adjustment BWP allocation for the carrier. In some implementations, configuration (a) may also correspond to a post-readjustment BWP allocation for the carrier. As illustrated, the carrier width is 100 MHz, but in practical implementations the carrier width may be narrower or (if the carrier 510 is part of Frequency Range 2) wider up to 400 MHz.

In FIG. 5A, when in configuration (a) the access node 300 is communicating with one or more wireless devices in a comparatively wide carrier band 510 which includes a first BWP 521. At some point, the monitoring module 312 may determine that a usage parameter exceeds a usage threshold and/or meets a set of criteria. In response, the scheduling module 313 configures a second BWP 522, such that the access node 300 operates in configuration (b) and may begin accepting connections in the second BWP 522 and/or switching existing connections from the first BWP 521 to the second BWP 522. As illustrated, the first BWP 521 has a first bandwidth of 20 MHz and second BWP 522 has a second bandwidth of 40 MHz, and is thus twice as wide as the first bandwidth. However, this state is exemplary and not limiting, and in other examples the second bandwidth may generally range in size from being equal to the first bandwidth to being equal to the carrier width minus the first bandwidth. While FIG. 5A illustrates a gap between the first BWP 521 and the second BWP 522, the second BWP 522 may be adjacent to or overlapping with the first BWP 521.

In FIG. 5B, when in configuration (a) the access node 300 is communicating with one or more wireless devices in a comparatively wide carrier band 510 which includes a first BWP 521. At some point, the monitoring module 312 may determine that a usage parameter exceeds a usage threshold and/or meets a set of criteria. In response, the scheduling module 313 reconfigures the first BWP 521 into a modified first BWP 521', such that the access node 300 operates in configuration (b). As illustrated, the first BWP 521 has a first bandwidth of 20 MHz and modified first BWP 521' has a second bandwidth of 40 MHz, and is thus twice as wide as the first bandwidth. However, this state is exemplary and not limiting, and in other examples the second bandwidth may generally range in size from being only slightly larger than the first bandwidth (e.g., by one RB) to being equal to the carrier width. While FIG. 5B illustrates the modified first BWP 521' as beginning with the same RB as the first BWP 521, the modified first BWP 521' may instead begin with a different RB.

Returning to FIG. 3, the wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive communications from the wireless device via the wireless communication circuitry 330 and output communications and/or control signals or instructions to the wireless device via the wireless communication circuitry 330, thereby managing traffic and network resources. The access node 300 may include additional wireless communication circuitry elements, for example to communicate using additional frequencies and/or to provide connectivity for different RATs. The access node 300 may further include additional wired communication circuitry elements.

Figure 4:
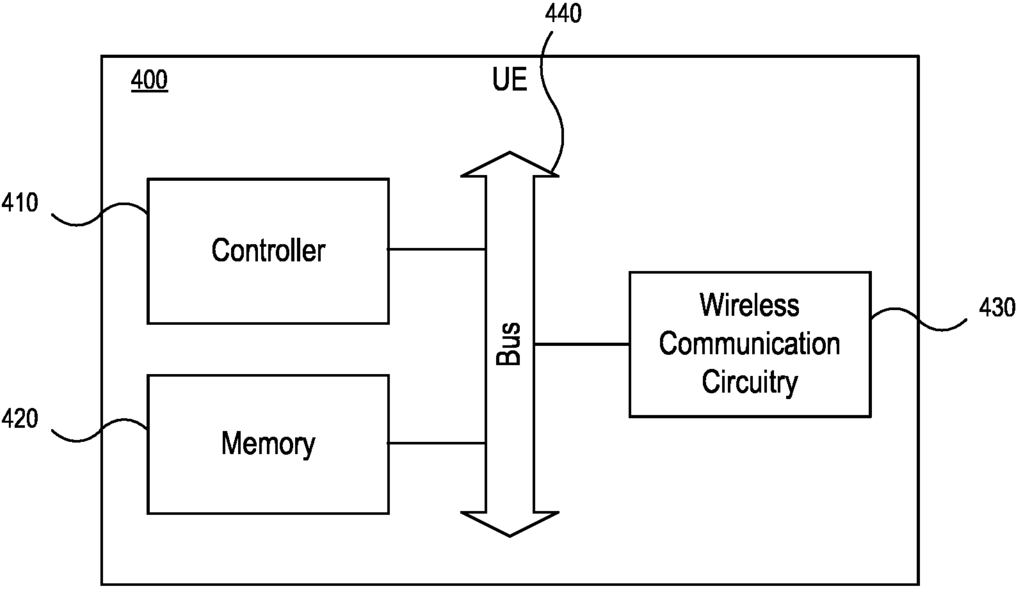
FIG. 4 illustrates an exemplary wireless device in accordance with various aspects of the present disclosure.

FIG. 4 illustrates one example of a wireless device 400 (i.e., a UE), which may correspond to one or more of the wireless devices 140 shown in FIG. 1 and/or one or more of the wireless devices 250 shown in FIG. 2. As illustrated, the wireless device 400 includes a controller 410, a memory 420, a wireless communication circuitry 430, and a bus 440 through which the various elements of the wireless device 400 communicate with one another. The controller 410 includes various sub-modules or units to implement operations and processes in accordance with the present disclosure. For example, the controller 410 may include modules that (e.g., in response to commands or instructions from an access node) may cause the wireless device 400 to switch among various carriers. Alternatively, the controller 410 may load a module from the memory 420 (e.g., a software module) to switch among various carriers.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit communications to the access node via the wireless communication circuitry 430 and receive communications and/or control signals or instructions from the access node via the wireless communication circuitry 430. The wireless device 400 may include additional wireless communication circuitry elements, for example to communicate using different RATs or different frequency resources.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless devices 250. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G Advanced, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links connecting the access node 230 to the 5G core 220 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G Advanced, or combinations thereof. The communication links may respectively be a direct link or might include various equipment, intermediate components, systems, and networks. The communication links may comprise many different signals sharing the same link.

The communication network 210, the access node 230, and/or the 5G core 220 may collectively implement several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a User Plane Function (UPF). Control plane NFs can provide one or more NFs based on a request-response or subscribe-notify model. In some implementations, the PCF implements the URSP manager. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 220. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 220, thereby terminating RAN control plane and UE traffic originating on either the N1 or N2 reference interface. In the 5G core 220, the functionality of the 4G Mobility Management Entity (MME) is decomposed into the AMF and the SMF. The AMF receives all connection and session related information from the UE using N1 and N2 interfaces, and is responsible for handling connection and mobility management tasks.

A Unified Data Repository (UDR) may also be present. The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in the system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access node 230 and the communication network 210.

Figure 6:
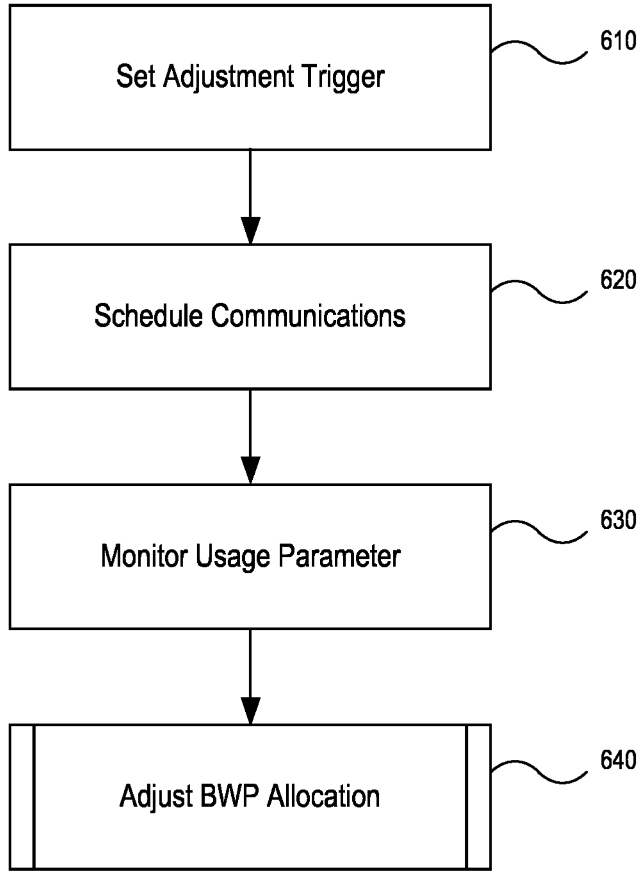
FIG. 6 illustrates an exemplary process flow for managing resources in accordance with various aspects of the present disclosure.

FIG. 6 illustrates an exemplary process flow for managing bandwidth (i.e., for dynamically adjusting BWPs). The operations of FIG. 6 will be described as being performed by the access node 300 for purposes of explanation. In other implementations, the operations may be performed by or under the control of a processing node external to the access node 300. Generally, the process flow may be implemented using any access node that is configured to communicate over a wideband which includes BWP(s). The process flow beings at operation 610 of setting one or more adjustment triggers for the access node.

The adjustment triggers may include trigger criteria and/or thresholds. Thresholds may include one or more device thresholds, capacity thresholds, quality thresholds, tonnage thresholds, resource thresholds, and/or switching thresholds. Trigger criteria may include a first criterion that a total number of the first plurality of wireless devices is larger than a device threshold, a second criterion that a remaining capacity of the access node in the first BWP is smaller than a capacity threshold, a third criterion that a connection quality in the first BWP is smaller than a quality threshold, a fourth criterion that a overall tonnage for the access node in the first BWP is larger than a tonnage threshold, a fifth criterion that a resource block utilization of the access node in the first BWP is larger than a resource threshold, or combinations thereof. The trigger criteria may additionally or alternatively include a criterion that a frequency of a switching of respective ones of the plurality of wireless devices from the first BWP to the second BWP is larger than a switching threshold, for example of the carrier includes or is adjusted to include a second BWP different from the first BWP.

At operation 620, the process flow includes scheduling communications with a plurality of wireless devices connected to the access node 300 over the first BWP. Operation 620 may begin by instructing the wireless devices to communicate over the first BWP and may persist for any length of time. Additionally, operation 620 and may be performed in parallel with one or more of the remaining operations illustrated in FIG. 6 or other operations not illustrated.

Operation 630 includes monitoring a usage parameter. The usage parameter may be related to a remaining capacity for communication between the access node 300 and connected wireless devices using the first BWP, to a number of users communicating via the particular BWP or number of wireless devices connected to the access node 300 via the first BWP, a connection quality in the first BWP, or combinations thereof. For example, the usage parameter may be a total number of the plurality of wireless devices connected to the access node 300, a remaining capacity of the access node 300 in the first BWP, a connection quality for connections between the access node 300 and connected wireless devices over the particular BWP, an overall tonnage for the access node 300 in the first BWP, a resource block utilization of the access node 300 in the first BWP, a frequency at which respective ones of the plurality of wireless devices switch from the first BWP to another BWP, or combinations thereof.

In response to a determination that the usage parameter triggers the adjustment trigger (i.e., exceeds one or more thresholds, meets one or more criteria, etc.), either at a given time or for at least a first predetermined amount of time, at operation 640 the BWP allocation of the carrier is adjusted. Operation 640 may include configuring an additional BWP within the carrier (e.g., a second BWP). The second BWP may have a larger bandwidth than the first BWP, but may have the same numerology as the first BWP to ensure device compatibility. In this implementation, operation 640 may further include instructing a subset of the plurality of wireless devices (e.g., one, some, or all of the plurality of wireless devices) to switch from communication with the access node 300 using the first BWP to communication with the access node 300 using the second BWP. Operation 640 may additionally or alternatively increasing a size of the first (existing) BWP from a first bandwidth to a second bandwidth larger than the first bandwidth.

The operations of FIG. 6 need not necessarily be performed one after another in immediate sequence. For example, operation 610 may be performed in advance, for example during a network configuration operation and/or during startup of the access node. Subsequently, operations 620 and 630 may be performed continuously until operation 630 determines that the usage parameter corresponds to the first trigger criteria for at least the first predetermined period of time, at which point operation 640 may occur. Operation 620-650 may be repeated with regard to a third BWP in the event that further adjustment triggers are met (e.g., if usage in the first BWP continues to increase even after an adjustment).

While the above descriptions illustrate various aspects of the present disclosure in which only a single BWP adjustment is performed (and in some cases reverted), the present disclosure is not so limited. The methods, operations, etc. described above may be performed in an iterative matter such that additional BWPs (e.g., a third BWP, a fourth BWP, and so on) may be configured based on comparisons between the usage parameter and further thresholds and criteria. These additional iterations may also be reverted in a manner similar to that described above, such that the BWP allocation may transition between any number of states so long as sufficient space exists within the carrier. Moreover, while the present disclosure describes implementations in which new BWPs are configured and implementations in which existing BWPs are reconfigured (i.e., expanded), in practice these implements may be combined. For example, where three or more states of BWP allocation exist, some transitions between states may include configuring a new BWP whereas other transitions between states may include expanding existing BWPs. In some examples, a single transition between states (even where only two states exist) may include both configuring a new BWP and expanding an existing BWP.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as “a,” “the,” “said,” etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing network resources, comprising:

setting a usage threshold for an access node, wherein the access node is configured to communicate with a plurality of wireless devices using a carrier including a first bandwidth part (BWP), wherein the first BWP has a first bandwidth;

scheduling communications with the plurality of wireless devices over the first BWP;

monitoring a usage parameter; and in response to a determination that the usage parameter exceeds the usage threshold, adjusting a BWP allocation by increasing a size of the first BWP with increasing a number of resource blocks for the first BWP within the carrier without switching the communications with the access node away from using the first BWP.

2. The method according to claim 1, wherein adjusting the BWP allocation for the carrier comprises configuring a second BWP within the carrier, wherein the second BWP has a second bandwidth larger than the first bandwidth.

3. The method according to claim 2, further comprising instructing a subset of the plurality of wireless devices to switch from communication with the access node using the first BWP to communication with the access node using the second BWP.

4. The method according to claim 1, wherein the usage threshold is set based on one or a combination of a time-of-day, a geography, a network architecture, and a current BWP allocation.

5. The method according to claim 1, wherein the usage parameter is related to one or a combination of a remaining capacity for communication in the first BWP, a number of users communicating via the first BWP, and a connection quality in the first BWP.

6. A system for managing network resources, comprising:

an access node configured to communicate with a plurality of wireless devices over a carrier including a first bandwidth part (BWP), the access node including at least one electronic processor configured to perform operations including:

setting a first usage threshold for the access node;

instructing the plurality of wireless devices to communicate with the access node over the first BWP;

monitoring a usage parameter for the access node; and in response to a first determination that the usage parameter exceeds the first usage threshold for at least a first predetermined amount of time, adjusting a BWP allocation by increasing a size of the first BWP with increasing a number of resource blocks for the first BWP within the carrier without switching the communications with the access node away from using the first BWP.

7. The system according to claim 6, wherein adjusting the BWP allocation of the carrier comprises configuring a second BWP within the carrier, wherein a second bandwidth of the second BWP is larger than a first bandwidth of the first BWP.

8. The system according to claim 7, the at least one electronic processor is configured to further perform operations comprising instructing a subset of the plurality of wireless devices to communicate with the access node over the second BWP.

9. The system according to claim 8, wherein a second numerology of the second BWP is the same as a first numerology of the first BWP.

10. The system according to claim 6, wherein the at least one electronic processor is configured to further perform operations comprising:

setting a second usage threshold for the access node; and after the first determination, and in response to a second determination that the usage parameter no longer exceeds the second usage threshold for at least a second predetermined amount of time, reverting to an initial BWP allocation of the carrier.

11. The system according to claim 6, wherein the first predetermined amount of time is set by a network operator.

12. A non-transitory computer-readable medium storing instructions that, when executed by an electronic processor of a processing node, cause the processing node to perform operations comprising:

scheduling communications between an access node and a plurality of wireless devices using a first bandwidth part (BWP) of a carrier;

monitoring a usage parameter for the access node; and in response to a determination that the usage parameter meets a utilization criteria, adjusting a BWP allocation by increasing a size of the first BWP with increasing a number of resource blocks for the first BWP within the carrier without switching the communications with the access node away from using the first BWP.

13. The non-transitory computer-readable medium of claim 12, wherein adjusting the BWP allocation for the carrier comprises configuring a second BWP within the carrier, the first BWP has a first bandwidth, and the second BWP has a second bandwidth larger than the first bandwidth.

14. The non-transitory computer-readable medium of claim 13, the operations further comprising, after configuring the second BWP, scheduling communications between the access node and a subset of the plurality of wireless devices using the second BWP.

15. The non-transitory computer-readable medium of claim 13, wherein the second bandwidth is twice as large as the first bandwidth.

16. The non-transitory computer-readable medium of claim 12, wherein the utilization criteria comprises one or more of: a first criterion that a total number of the plurality of wireless devices is larger than a device threshold, a second criterion that a remaining capacity of the access node in the first BWP is smaller than a capacity threshold, a third criterion that a connection quality in the first BWP is smaller than a quality threshold, a fourth criterion that a overall tonnage for the access node in the first BWP is larger than a tonnage threshold, and a fifth criterion that a resource block utilization of the access node in the first BWP is larger than a resource threshold.

17. The non-transitory computer-readable medium of claim 12, wherein the carrier includes a second BWP different from the first BWP, and the utilization criteria includes a criterion that a frequency of a switching of respective ones of the plurality of wireless devices from the first BWP to the second BWP is larger than a switching threshold.

* * * * *